(12) United States Patent
Dowling

(10) Patent No.: US 6,370,640 B1
(45) Date of Patent: Apr. 9, 2002

(54) VIRTUAL SHADOW REGISTERS AND VIRTUAL REGISTER WINDOWS

(75) Inventor: Eric M. Dowling, Richardson, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/649,152

(22) Filed: Aug. 28, 2000

Related U.S. Application Data

(62) Division of application No. 08/989,732, filed on Dec. 12, 1997, now Pat. No. 6,128,728.
(60) Provisional application No. 60/054,484, filed on Aug. 1, 1997.

(51) Int. Cl.[7] .............................. G06F 9/40; G06F 9/46
(52) U.S. Cl. ......................................... 712/228; 710/22
(58) Field of Search ..................... 712/23, 244, 228; 710/46, 48, 260, 263, 22; 711/167, 228

(56) References Cited

U.S. PATENT DOCUMENTS

| | | | |
|---|---|---|---|
| 3,373,408 A | 3/1968 | Ling | 712/228 |
| 3,614,740 A | 10/1971 | Delagi et al. | 712/228 |
| 3,781,810 A | 12/1973 | Downing | 712/228 |
| 5,159,680 A | 10/1992 | Joe et al. | 712/41 |
| 5,327,566 A | 7/1994 | Forsyth | 710/260 |
| 5,381,538 A | 1/1995 | Amini et al. | 711/156 |
| 5,426,766 A | 6/1995 | Ogata | 711/5 |
| 5,517,664 A | 5/1996 | Watanabe et al. | 705/8 |
| 5,530,873 A | 6/1996 | Takano | 710/260 |
| 5,550,993 A | 8/1996 | Ehlig et al. | 712/229 |
| 5,560,035 A | 9/1996 | Garg et al. | 712/23 |
| 5,564,117 A | 10/1996 | Lentz et al. | 345/502 |
| 5,584,032 A | 12/1996 | Hyatt | 711/100 |
| 5,590,356 A | 12/1996 | Gilbert | 712/31 |
| 5,642,516 A | 6/1997 | Hedayat et al. | 710/260 |
| 5,774,684 A | * 6/1998 | Haines et al. | 710/129 |
| 5,848,276 A | * 8/1998 | King et al. | 710/200 |
| 5,987,590 A | 11/1999 | So | 712/35 |
| 6,128,728 A | 10/2000 | Dowling | 712/228 |

* cited by examiner

Primary Examiner—David Y. Eng
(74) Attorney, Agent, or Firm—Gazdzinski & Associates

(57) ABSTRACT

A direct memory access and direct register access (DMA/DRA) controller and method are used on microprocessors, microcontrollers and digital signal processors which incorporate shadow register sets or register windows or both. The DMA/DRA controller is coupled to the processor's data paths so as to transfer data between the registers and memory in burst and in cycle-steal modes. The DMA/DRA controller enables the processor to perform single-cycle register set save and restore operations by extending the effective depth of the shadow register set by creating virtual register sets in memory. The DMA DRA subsystem interacts with the caches and other memory traffic controllers to perform the register set transfers before they are needed making use of otherwise unused external memory cycles. Using this invention, delays associated with register saving and restoring can be largely eliminated without the need for unduly large and costly internal sets of register files.

19 Claims, 10 Drawing Sheets

VIRTUAL SHADOW REGISTERS AND VIRTUAL REGISTER WINDOWS

REFERENCE TO RELATED APPLICATIONS

Pursuant to 35 U.S.C. 119(e), the present application claims priority benefit of provisional application No. 60/054,484, filed Aug. 1, 1997, and is a divisional of U.S. patent application Ser. No. 08/989,732 filed Dec. 12, 1997 entitled "Virtual Shadow Registers And Virtual Register Windows" now U.S. Pat. No. 6,128,728.

BACKGROUND OF THE INVENTION

1. Field of the Invention

This invention relates to the field of microprocessor architectures. More particularly, the invention relates to reducing overhead associated with register set saving and restoring as is required when invoking functions, exception handlers, and interrupt service routines. The invention further relates to register shadowing and windowing strategies to reduce function calling and task switching times in multi-issue processors, especially superscalar RISC processors and very long instruction word (VLIW) digital signal processors (DSPs).

2. Description of the Prior Art

Studies show that register saving and restoring in response to function calls and returns accounts for between 5% and 40% of the data memory traffic in executing programs written in a high level programming language. Also, the registers must be saved whenever a program switches tasks. In a UNIX operating system, for example, this accounts for approximately 20% of the task switching overhead. In more streamlined real-time operating systems as are common with embedded processors and DSPs, register saving and restoring accounts for a much higher percentage of the task switching time. Even interrupt service routines that do not require a full task switch still require at least some of the registers to be saved and restored. This adds significant overhead in many cases.

Register shadowing and windowing techniques have been introduced in an effort to reduce delays associated with register set storing and loading. Prior art processor architectures that incorporate shadow registers or register windows are discussed in detail in John L. Hennessy and David A. Patterson, "Computer Architecture: A Quantitative Approach," Morgan Kaufmann Publishers, Inc., San Francisco, Calif., 1991. These concepts are by now employed on some high performance RISC processors and DSPs. For example, the Analog Devices ADSP21xx series of DSPs use a shadow register bank. Sun Microsystem's SPARC processors use windowed register banks. These register systems allow the processors to switch register sets in a single cycle.

Register shadowing is a technique whereby a primary register set is shadowed by a mirror image register set. When a register set switch command is issued, the machine context can be switched from the primary register set to the shadow register set. Shadow register sets are useful for fast switching between tasks or between a primary program and an interrupting program. For example, in a DSP, a supervisory task may run in the background while the main signal processing algorithm runs in the foreground. This technique can be supported for example, in the Analog Devices ADSP21xx series of DSPs. In the ADSP21xx processors, there is only one shadow register set. Hence, single-cycle context switching can only occur between one primary task and one secondary task. Also, in the case of the ADSP21xx, the address registers are not saved upon a shadow register switch. Hence in applications, a long sequence of commands is required to save and restore the address registers, requiring a significant time penalty.

As can be seen from the foregoing discussion, a problem with shadow register systems is their inability to provide single-cycle context switching to more than one task. In theory, if N shadow register sets are added, then single-cycle task switching between N+1 tasks is possible. The problem, however is that if more than N+1 tasks need to be supported, the single-cycle task switching will only be possible between a subset of the total number of tasks. Also, a significant amount of silicon area is needed for each added shadow register set. Finally, the software that manages the tasks becomes difficult and less efficient because it has to manage a first type of task that has its context stored in a shadow register set, and a second type of task that has its context stored in memory. Whenever a task of the second type is invoked, context switch oriented register save and restore operations are required. For these reasons, shadow register sets have not gained widespread popularity.

Shadow register sets can optionally be used for register save and restore operations related to function calling and returning. For example, if the processor has a single shadow register set, a base level function can make a call to a first level function, and can perform a register bank switch so that the first level routine can save the registers and then restore them in single cycles. The problem is that this capability only exists for a single level of function calling. If the first level function were to call a second level function, both the primary and the shadow register sets would be occupied, requiring multiple cycles for all register save and restore operations related to subsequent function calls. Again, adding more shadow register sets extends the number of levels of function calls that can be supported with single-cycle register store and restore operations, but only at the price of a significant amount of silicon area. Moreover, the software becomes complicated due to the need to keep track of the current level of function nesting. For these reasons, shadow registers find limited use in function calling.

Register window systems are an extension of the shadow register concept and are designed to accelerate function calling. In a register window system, a group of shadow register sets is typically arranged as a circular buffer. When a function call is made, the active register set advances from one set to the next in the circular buffer. When the buffer wraps, an overflow is said to occur. Upon an overflow, a sequence of memory transfers is needed to save the first register file in the circular buffer arrangement to insure it does not get overwritten. As verified by the analysis of execution patterns of large numbers of benchmark programs, by making the circular buffer deep enough, usually on the order of twelve to sixteen register sets, the overhead associated with register save and restore operations can be made to be negligible.

Prior art register window systems have many drawbacks and are thus not used in most modern high performance processor designs. First of all, a twelve-level to sixteen-level deep register window system requires an excessive amount of silicon area. Secondly, as the total number of registers in the circular buffer of register files increases, the number of register address lines, and hence the amount of time needed for register address decoding increases. Longer register address access times lead to slower system clocks and thus slower overall processors. Thirdly, as the number of register sets in the windowing system increases, the number of registers that must be saved when a task switch occurs increases proportionally. This adds a significant overhead to task switching and adds interrupt latency. Adding multiple copies of shadowed register window systems to provide single-cycle task switching would require an enormous amount of silicon area and would have the same limitations relating to shadow registers as discussed above.

The problems become more severe in DSPs. For example, in machines such as the SPARC, the floating point registers are not included in a register window switch. Rather, floating point registers must be loaded and saved under program control. This would not be acceptable on a floating point DSP. The reason the floating point registers are not added to the register window on the SPARC is because, unlike on floating point DSPs, the floating point registers are not used as widely. DSPs also often contain the ALU core registers as well as address registers and possibly other types of auxiliary registers that would need to be added to the register windowing system. Modern load-store VLIW DSPs have multiple register sets that would need to be windowed multiple times to create an effective register window system. Hence, it can be seen that register windows become prohibitively expensive to implement with most DSP architectures.

In U.S. Pat. No. 3,781,810, a system is disclosed to speed up the storing and the retrieving of registers when the machine context must be switched in a nested fashion. Upon the occurrence of an interrupt, when a "store" command is issued, a selected subset of the register set is transferred to an auxiliary register set simultaneously via parallel data paths. The data in the auxiliary registers are then transferred to the memory in the background by using otherwise unused memory transfer cycles. If another store command is issued prior to the background transfer, the transfer is allowed to complete in the foreground. Register restore operations are processed similarly. The auxiliary registers are restored in the background, and are then transferred simultaneously into the primary register set. This technique has drawbacks that limit performance. For example, in the register store operation, the auxiliary register set must be overwritten with the contents of the currently active register set. This means that the auxiliary register set cannot supply useful information to be used in the task switch. It would be more effective to provide a system whereby the current register set could be transferred out to memory, and context could be switched to a shadow register set in a single cycle. Instead of the auxiliary register set being filled with the data to be transferred out to memory, it would be desirable to allow it to be preloaded with useful information to enable a truly nested single cycle task switching capability. The disclosure in U.S. Pat. No. 3,781,810 only allows for single directional transfers at a given time and needs to be extended to support store-and-load operations, delayed interrupts, and various methods for accelerated task switching disclosed herein.

A shadow register system is disclosed in U.S. Pat. No. 5,327,566. In this system, a SAVE command is issued to cause the processor to latch the register contents into a shadow register set. A RESTORE command is used to cause the processor to latch the previously saved register contents from the shadow register set back to the primary register set used by the processor. Also, in one aspect of the disclosure of U.S. Pat. No. 5,327,566, when an interrupt is detected, the processor automatically latches the register contents into the shadow register set, and, when a return from interrupt instruction is issued, the processor automatically restores the register contents. No interrupt nesting is supported by the system of U.S. Pat. No. 5,327,566. That is, if a program is interrupted by a first interrupt service routine which is then interrupted by a second interrupt service routine, the register context of the original program will be destroyed and will be unrecoverable. The concept of automatic register saving in response to interrupts needs to be expanded to support nested interrupts.

Therefore, it is a primary object of this invention to provide improved systems for register shadowing and register windowing. It is desired to implement a minimal number of register sets in a circularly buffered configuration to provide higher performance register shadowing and windowing systems at a fraction of the cost of prior art systems.

Another objective is to provide an architecture to allow data to transfer between the register set and the memory so that register set store and load operations can proceed concurrently with normal processing in advance of being needed.

Another objective of the invention is to provide improved methods for task switching in processors employing the inventive register shadowing and windowing systems. Another objective is to provide new interrupt modes that perform register set store and load operations automatically without incurring program cycle overhead.

Another objective of the invention is to provide a register shadowing system for VLIW and superscalar processors that include multiple register sets.

Another objective is to provide a register windowing system with a much lower silicon area requirement and to provide a method to accelerate task switching with this system.

SUMMARY OF THE INVENTION

One aspect of the present invention is a processor that can perform single-cycle task switches for an arbitrary number of tasks using the register shadowing technique of the current invention. In this technique, a direct memory access/direct register access (DMA/DRA) controller of the present invention is employed to perform shadow register set store and load operations in the background. The DMA/DRA controller is operative to monitor bus activity within the processor core, and to use otherwise unused cycles to transfer the shadow register set to a designated memory area and to load the shadow register set from another designated memory area. When the task switch occurs, then, the register set context for the next task is made available by issuing a single-cycle register set switch command (referred to henceforth as a "single-cycle task switch command").

Another aspect of the present invention is a DMA/DRA controller that performs register set store and load operations in cycle-steal and high priority burst modes. The DMA/DRA controller can be initialized under software control and may include a list manager that manages sequences of shadow register set store and load operations.

Another aspect of the present invention is a method to perform look-ahead for register set load and store operations to reduce task switching overhead in multitasking executive. A related aspect of the present invention is a delayed interrupt processing technique that stores and or loads the shadow register set in response to designated interrupts in the background before conventional interrupt processing is allowed to begin. Interrupt descriptors of the present invention are used to define the register set store and load addresses.

Another aspect of the present invention is a shadow register system for use in VLIW DSPs. In this case, multiple register sets are shadowed. Either a single DMA/DRA controller or multiple DMA/DRA controllers are associated with the shadow register sets. Techniques are provided to speed task switching in VLIW DSPs implemented with the improvements of the current invention. A low cost register windowing system implemented with this simple shadow register arrangement is also presented.

Another aspect of the invention is a processor that implements a virtual register window system. This system appears as an arbitrary depth circular buffer, but is mostly implemented in main memory. Look-ahead and cycle-steal techniques are used to minimize the overhead associated with subroutine related register set save and restore operations using a minimal on-chip register window buffer. A method to accelerate task switching in processors with this type of register window system is also presented.

Another aspect of the present invention is a processor coupled to an internal or external memory. The processor comprises a processor core which comprises one or more functional units. A set of instructions are executed by the processor. The instructions include a register direct addressing mode wherein registers serve as operands to the instructions. A first register set is coupled to the functional units via a first data path. At least one shadow register set duplicates at least a subset of the first register set. The at least one shadow register set is coupled to the processor core via a second data path. The first and second data paths may overlap. At least one instruction in the instruction set is used to switch the active register set between the first register set and the at least one shadow register set. A direct memory access/direct register access (DMA/DRA) controller is coupled to the register sets and to the internal or external memory. The DMA/DRA controller transfers data directly between the register sets and the internal or external memory. The DMA/DRA controller responds to commands and control signals to transfer at least a portion of the contents of either the first register set or the shadow register set to or from a buffer area in the internal or external memory to free the processor core to concurrently process other instructions. Advantageously, the instruction used to switch between register sets is a toggle instruction which activates the inactive register set and deactivates the currently active register set. The first register set and the at least one shadow register set may include a third data path to couple the register sets to an internal or external memory so that transfers between the inactive register and the memory can occur simultaneously with transfers between the active register set and the processor core. In certain embodiments, the DMA/DRA controller receives information indicating the cycle-by-cycle utilization of data bussing resources required by the processor during program execution, and the DMA/DRA controller further transfers data between the register sets and the internal or external memory in a cycle steal mode, making use otherwise of the unused bandwidth available between the register sets and the internal or external memory. The DMA/DRA controller may also receive a priority signal, where, upon assertion, the DMA/DRA controller completes the data register to or from memory transfer in a burst mode. An on-chip memory buffer area may be included to provide high-speed transfer of data out of the shadow register set during a burst transfer. Advantageously, a separate data port may be included to allow data to transfer from the shadow register set to a second off-chip memory buffer area at the same time as data transfers from the external or internal memory into the shadow register set during a burst transfer. In certain embodiments, the DMA/DRA controller generates a done signal to indicate to the processor core when the register set store or load operation is complete. A bus switch may be used to couple the external or internal memory to the first and second data paths between the processor core and the register sets and to couple the external or internal memory to a second data path that routes to a second port of the register sets so that the inactive register set can be loaded and unloaded while the active register set performs data transactions with the processor core.

Another aspect of the present invention is a computer system which comprises a memory system containing program instructions and data, a processor which includes a processor core having one or more functional units, a first register set coupled to the functional units via a first data path, and at least one shadow register set which duplicates at least a subset of the first register set. The shadow register set is coupled to the processor core via a second data path. The first and second data paths may overlap. A set of instructions are executed by the processor. The instructions include a register direct addressing mode wherein registers serve as operands to the instructions. At least one instruction in the instruction set is used to switch the active register set between the first register set and the shadow register set. A direct memory access/direct register access (DMA/DRA) controller is coupled to the register sets and to the internal or external memory. The DMA/DRA controller transfers data directly between the register sets and the internal or external memory. The DMA/DRA controller responds to commands and control signals to transfer at least a portion of the contents of either the first register set or the shadow register set to and from a buffer area in the internal or external memory, thereby freeing the processor core to concurrently process other instructions. Preferably, the computer system executes a multitasking operating system or a multitasking executive which uses the register sets and the DMA/DRA controller to accelerate register set save and restore operations during task switching. The DMA/DRA controller advantageously accelerates register set save and restore operations for subroutine procedure calls and returns.

Another aspect of the present invention is a direct memory access/direct register access (DMA/DRA) controller operative to control information transfer between memory and at least one register set. The DMA/DRA controller comprises a core interface coupled to a processor core. The core interface is operative to receive control signals and commands and to send out status information. A control unit is coupled to the core interface. The control unit responds to the control signals and commands to generate control sequences needed to manage data transfers between the memory and the register set. The control unit also generates status information indicative of events related to the data transfer. A memory address pointer register is coupled in a feedback arrangement to an arithmetic unit which manipulates an address within the memory address pointer register. A register address pointer register is coupled in a feedback arrangement to an arithmetic unit which manipulates an address within the register address pointer register. A transfer control signal generator operates to generate timing and control signals to the register and memory interfaces involved in the data transfer. In certain embodiments, the arithmetic unit associated with the memory pointer register provides a simple autoincrement function and a simple autodecrement function. In alternative embodiments, the arithmetic unit associated with the memory pointer register provides an autoincrement by specified contents function and an autodecrement by specified constants function. In particular embodiments, the DMA/DRA controller is coupled to an active register set and to at least one inactive shadow register set, wherein the DMA/DRA controller controls transfer operations between memory and the shadow register set while the active register set performs transactions with the processor core. The DMA/DRA controller preferably includes a list manager. The list manager comprises a pointer to an entry in a descriptor table and comprises a list control unit responsive to descriptors stored in the descriptor table. Each descriptor contains at least a reference to a source or destination memory address involved in a DMA/DRA controlled register set transfer. The list control unit is operative to load the memory address register in response to information stored in the descriptor and to load the register address register in response to a bit field which indicates the target inactive shadow register set. The list control unit is further operative to obtain the address of the next entry in the descriptor table for future processing. A priority field indicates the priority of the DMA/DRA transfer associated with the descriptor. The descriptor preferably further comprises a next entry field to allow the descriptor table to take the form of a linked list. The descriptor may also include a field which provides a reference to indicate that the source or destination memory address register is to be loaded with a stack pointer, and may also include a field which contains the source or destination memory address to be loaded into the memory address pointer.

Another aspect of the present invention is a method for operating an instruction set processor coupled to an internal or external memory. The processor comprises one or more functional units and first and second register sets, wherein one of the register sets is an active register set presently responsive to processor instructions involving register operands and the other register set is a shadow register set not presently responsive to processor instructions involving register operands. The processor further comprises at least one instruction to switch the active register set to a shadow state and the shadow register set to an active state. The processor includes a DMA/DRA controller capable of controlling sequences of data transfers between the shadow register set and memory. The method is a method of register set storing and loading which comprises the steps of issuing one or more commands which include either operands or references to one or more descriptors to set up the DMA/DRA controller to transfer data to or from the shadow register set and from or to a buffer area in memory. The method includes the further steps of monitoring the bus activity in the processor to determine when unused memory bandwidth is available, and moving the shadow register contents under the control of the DMA/DRA controller to or from the memory buffer during those cycles deemed to possess unused memory bandwidth. Preferably, the method includes the step of providing a done signal to the main control unit of the instruction set processor when the shadow register to or from memory transfer is complete. Also preferably, the method includes the step of responding to a priority move signal, such that when the priority move signal is asserted, the transfer will switch from using only unused cycles to a high priority burst mode which uses all cycles necessary to transfer data at a high data rate. In particular embodiments, the method implements steps in the main controller of the instruction set processor. In particular, the method issues the instruction to switch the active register set and checks the done signal returned by the DMA/DRA controller. If the done signal is asserted, the method proceeds to execute the active register set switch command. If the done signal is not asserted, the method asserts the priority move signal and proceeds to execute the active register set switch command only after the done signal is recognized.

Another aspect of the present invention is a method in a computer system which incorporates a memory system, a processor and input/output devices. The processor is responsive to interrupts. The processor comprises first and second register sets with the first register set in an active state and the second register set in a shadow state. The processor includes an active register set switch command. A DMA/DRA controller is operative to transfer data between the shadow register set and the system memory. The method is a method of accelerated task switching which comprises the step of maintaining a set of interrupt service routines. Each routine is associated with and is activated in response to a specified interrupt. The interrupts are categorized as general interrupts and as a real-time clock interrupt for a multitasking scheduler. An interrupt service routine is associated with a given one of the general interrupts and sets a ready flag in a task control block associated with the given one of the general interrupts. The interrupt service routine for the real-time interrupt activates a scheduler responsive to information in each of the task control blocks. The scheduler performs the steps of decrementing a time-to-run variable for the currently running task and checking the ready flags in the task control blocks together with priority indicators contained therein to determine the next task to run. If a next task to run has a higher priority than the current task, the scheduler checks to see if the shadow register empty flag is set, and if the shadow register empty flag is set, the scheduler issues a burst shadow register set load command to the DMA/DRA controller to fill the shadow register set with the context of the next task to run. The scheduler then passes control to the next task to run. If the shadow register empty flag is not set, the scheduler issues a burst shadow register set store-and-load command to the DMA/DRA controller, and, upon completion, passes control to the next task to run. If the next task to run has a priority equal to or less than the currently running task, the scheduler performs a return from interrupt if the time-to-run variable is more than a specified number of ticks away from completion; issues a shadow register load command from the task control block of the next task to run if the time-to-run variable is at a specified value; and issues a single-cycle active register set switch command and switches tasks if the time-to-run has decremented to its terminal value.

Another aspect of the present invention is a method in a computer system which incorporates a memory system, a processor, and input/output devices. The processor is responsive to interrupts and comprises first and second register sets. The first register set is in an active state and the second register set is in a shadow state. The processor includes an active register set switch command. A DMA/DRA controller is operative to transfer data between the shadow register set and memory. The method is a method of reducing context switching in response to interrupts. The method comprises the step of issuing a context switch by a device in the computer system. Interrupts are categorized into at least two classes. A first class is a conventional interrupt, and a second class is a delayed interrupt. When the interrupt request is categorized as a delayed interrupt, shadow register to and from memory transfer instructions are automatically issued from the processor to the DMA/DRA controller. When the DMA/DRA controller indicates the transfer is complete, the method finishes the current instruction and returning information is stacked in a conventional manner. Control is then passed to the associated interrupt service routine. In preferred embodiments of the method, the interrupt service routine issues a single-cycle active register set switch command to switch the register context from the currently active register set to the shadow register set. Also preferably, a single-cycle active register set switch command is automatically issued to switch the active register context as a part of the interrupt processing sequence just prior to activating the interrupt service routine. The register set to and from transfer instructions are preferably either background commands or priority store-to-stack commands. Alternatively, the register set to and from transfer instructions are either background commands or priority store-and-load commands. In the further alternative, the register set to and from transfer instructions are either background commands or priority load commands. In preferred embodiments of the method, prior to issuing a return from interrupt command, the interrupt service routine issues a background save shadow register set command, where the target address is either specified by an specific address pointer or a stack pointer. The interrupt category and the DMA/DRA related information are advantageously contained in an interrupt descriptor which comprises fields to automatically program the DMA/DRA controller. In certain embodiments, the interrupt descriptor further comprises an interrupt branch address. The fields may comprise at least one of the following:

a limit field which specifies all or a subset of the shadow register set that needs to be transferred;

a store field which indicates that a store operation is required if a shadow register empty flag is not set;

a load field which indicates whether the shadow register set needs to be loaded;

a stack or pointer field which indicates whether the load and store operations use pointers contained in the descriptor, or use a stack pointer;

a list manager field which indicates whether the interrupt is associated with a list manager that maintains a descriptor table;

a register set store address; and a register set load address.

Another aspect of the present invention is a method for use with a processor which responds to interrupts and which comprises first and second register sets. The first register set is in an active state and the second register set is in a shadow state. The processor includes an active register set switch command. A DMA/DRA controller operates to transfer data between the shadow register set and memory. The method is a method of reducing context switching in response to interrupts. The method comprises the step of issuing an interrupt request by a device in the computer system. Interrupts are categorized into at least a first class and a second class. The first class is a conventional interrupt, and the second class is a delayed interrupt. When a received interrupt request is categorized as a delayed interrupt, a shadow register to/from memory transfer instruction is automatically issued from the processor to the DMA/DRA controller. When the DMA/DRA controller indicates the transfer is complete, the current instruction is finished, information is returned stacked in a conventional manner, and control is passed to the associated interrupt service routine.

Another aspect of the present invention is an apparatus which comprises a very long instruction word processor having multiple functional units which receive different dispatched portions of a very long instruction word. At least one of the functional units is coupled to at least one active register set and to at least one inactive (shadow) register set. The coupling occurs via at least one data path. At least one instruction in the instruction set is used to switch the active register set between the active register set and the shadow register set. A direct memory access/direct register access (DMA/DRA) controller is coupled to the register sets and is coupled to at least one of an internal memory or an external memory. The DMA/DRA controller transfers data directly between the register sets and the at least one of the internal memory and the external memory. The DMA/DRA controller responds to commands and control signals to transfer at least a portion of the contents of one or more register sets to and from at least one buffer area in the at least one of the internal memory and the external memory to free the processor core to concurrently process other instructions. In certain embodiments, the DMA/DRA controller includes multiple channels to move multiple register sets to or from memory. Preferably, the DMA/DRA controller includes parallel hardware to move the multiple channels of register set data to or from memory concurrently along parallel data paths.

Another aspect of the present invention is an apparatus which comprises a processor core having one or more functional units which receive dispatched instructions. One or more of the functional units are coupled to a register window buffer containing at least two register sets. The register window buffer is responsive to instructions which change the active register window. A direct memory access/direct register access (DMA/DRA) controller is coupled to the register window buffer sets and to either an internal memory or an external memory. The DMA/DRA controller is used to transfer data directly between the register sets and the internal or external memory. The DMA/DRA controller is responsive to commands and control signals to transfer at least a portion of the contents of one or more register sets to or from one or more buffer areas in the internal or external memory, thereby freeing the processor core to concurrently process other instructions and extending the effective length of the register window system. In preferred embodiments, the apparatus includes a cache memory and a bus interface unit. The bus interface unit couples data from the external memory to the cache memory. In one such preferred embodiment, the cache memory is connected directly to the bus interface unit. Alternatively, the apparatus includes a memory request queue between the bus interface unit and the cache. In certain preferred embodiments, the memory request queue is coupled to the DMA/DRA controller, and the DMA/DRA controller transfers data between the register sets and the memory request queue.

Another aspect of the present invention is a method in a computer system which employs a multitasking operating system executive. The method is a method of reducing the time required to switch tasks within processors containing virtual register window systems. The method comprises the steps of maintaining the register context of each task in a memory area contained within a task control block or referenced by a pointer within a task control block and maintaining the extended virtual register set extensions in the same memory area. Upon task switching, only the portion of the virtual register window system that is not already stored in the memory area is stored. In preferred embodiments of this method, a parameter may be set that causes the processor to attempt to mirror the contents of all inactive register windows in the memory area so that, at the task switch time, a minimal number of registers will need to be saved. Preferably, the parameter is set when a time-to-run variable indicates that the task switch time is eminent.

BRIEF DESCRIPTION OF THE DRAWINGS

The various novel features of the invention are illustrated in the figures listed below and described in the detailed description which follows.

DETAILED DESCRIPTION OF THE PREFERRED EMBODIMENT

Figure 1:
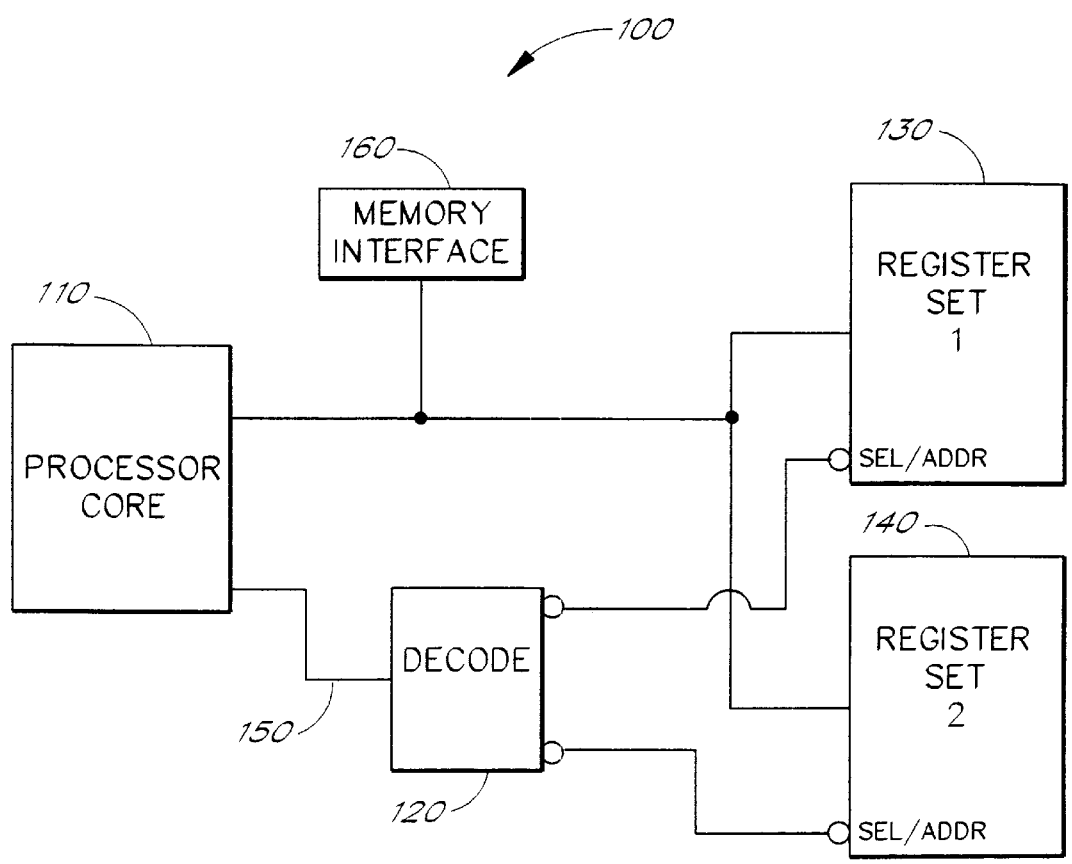
FIG. 1 is a block diagram that illustrates a prior art processor with a shadow register file.

FIG. 1 is a block diagram that illustrates a conventional processor 100 employing a shadow register set. A processor core 110 internally comprises an instruction processing control unit, functional units, and data paths. The processor core 110 is connected to a first register file 130 and to a second register file 140. A register file select control signal 150 is operative to control a register set selector 120 that selects either the first register set 130 or the second register set 140 to be the active register set responsive to instructions with register operands issued by the processor core 110. A memory interface 160 connects to the processor core 110 and to the register files 130 and 140. Other configurations are known in the prior art. For example, more than one shadow register set could be incorporated into the system so that the decoder 120 would select between multiple different register sets. Also, the memory interface 160 could be buffered in various ways to allow data to move between register banks and the processor core 110, and also between the register banks and memory simultaneously. Moreover, in many prior art processors, multiple parallel data paths are made available to allow multiple operands to move between the processor and the registers in a single cycle. For example, a single instruction could fetch two operands from memory simultaneously while at the same time another instruction further down in the pipeline stores a result back to the register file. In this case, the illustrated data paths would include three parallel paths.

In the prior art system of FIG. 1, the context can be switched between register banks with the assertion of the single control signal 150. The control signal 150 is normally asserted in response to a single-cycle task switch command. Whenever the context must be switched between more than two tasks; however, the registers must be saved and later restored to and from external memory. While the prior art systems can handle a single function call or interrupt/exception well, if a set of nested function calls or if nested interrupts/exceptions occur, the prior art system is unable to provide a benefit. If multiple levels of shadow registers are provided, they can only be used up to a fixed number of levels. Since interrupts and exceptions are often unpredictable, even systems that spend more silicon area on more shadow register sets have limited use.

Figure 2:
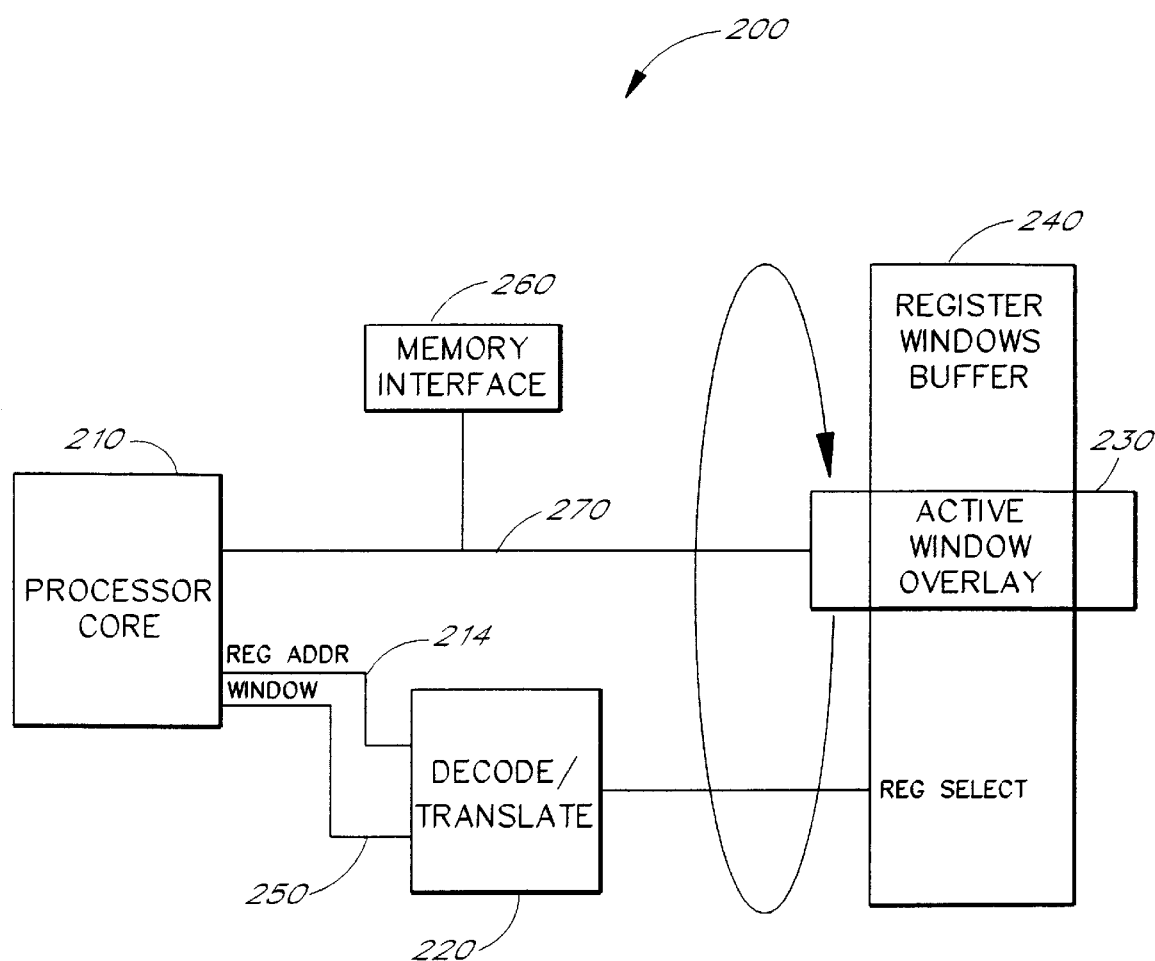
FIG. 2 is a block diagram that illustrates a prior art processor with a register windowing system.

FIG. 2 is a block diagram that illustrates a conventional processor 200 employing a register windowing system. A processor core 210 internally comprises an instruction processing control unit, functional units, and data paths. The processor core 210 is connected via a register address bus 214 to a register address decoder 220 that converts logical register addresses into register select signals. The mapping of logical register addresses to physical register select signals defines an active register window 230. The active register window comprises a set of registers within an address register bank 240. Individual registers within the active window are selected in response to register operands in instructions. A register window position control signal 250 is operative to control the address decoder 220 to position the active register window 230 in the register bank 240. A memory interface 260 connects to the data path 270 of the processor core 210 and to the register bank 240. Other configurations are common. For example, the memory interface 260 may contain separate paths to the register bank 240 and the processor core 210. Many processors also include on-chip data or program cache memories or both.

The register window system of FIG. 2 is operative to move the active register set as seen by the processor up or down in response to function calls and return instructions. Often, the active register window moves in an overlapped fashion to facilitate parameter passing. If there are more function calls in a row than there are window positions in the buffer, then an overflow is said to occur and the oldest register file in the buffer area needs to be saved to memory. This adds cycles to the execution time. Also, upon a context switch, the larger register file buffer area must be saved.

Figure 3:
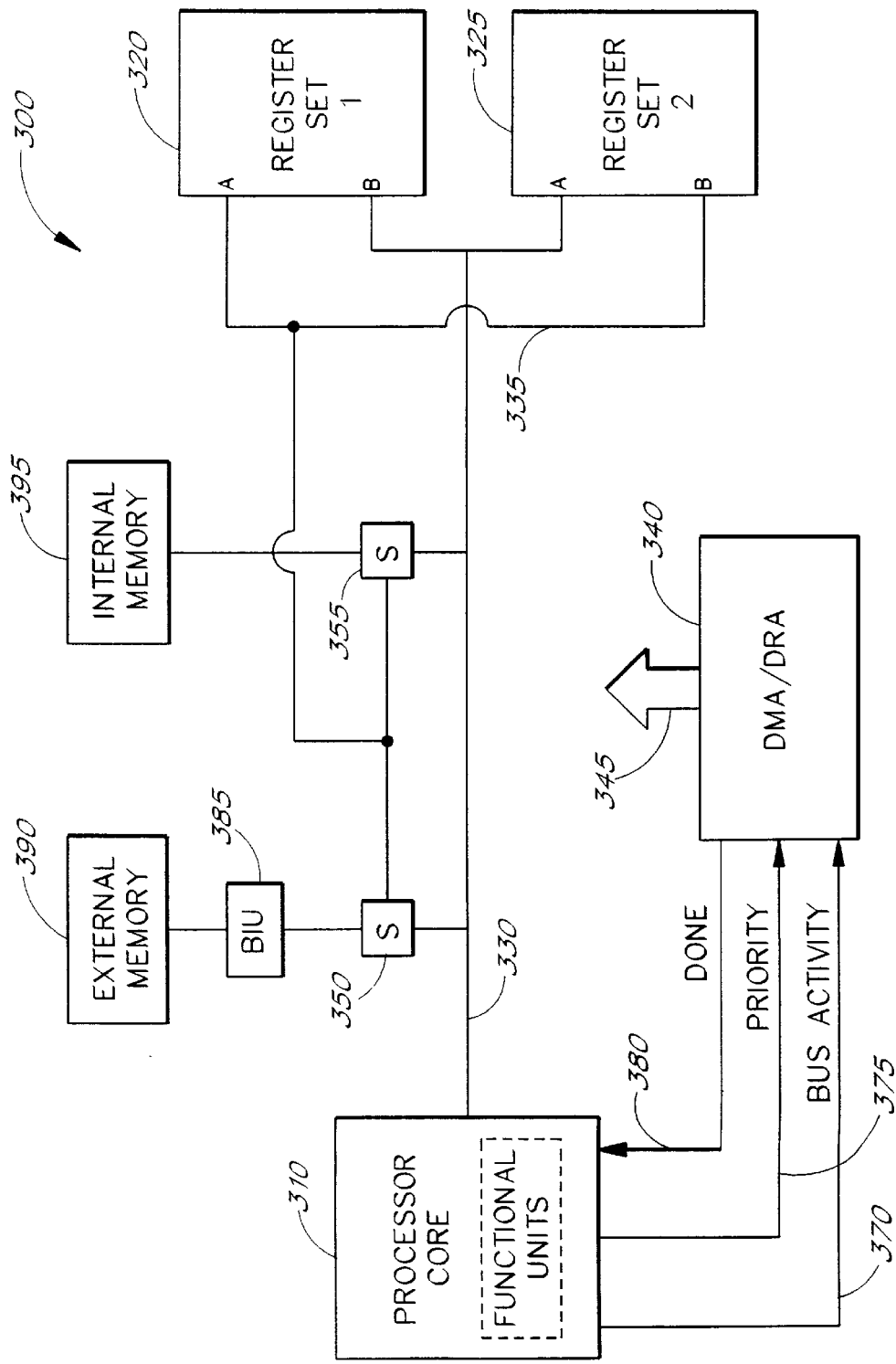
FIG. 3 is a block diagram that illustrates a processor according to the present invention which incorporates primary and shadow register sets and which uses a DMA/DRA controller to implement virtual register sets.

FIG. 3 illustrates a preferred embodiment of a processor 300 that provides virtual shadow register capabilities. In various embodiments, for example, the processor 300 could be a superscalar RISC processor, a CISC processor, a microcontroller, or a DSP. The processor 300 contains a conventional processor core 310 that internally includes functional units, control logic, and data paths. The processor 300 also includes first and second on-chip conventional register sets 320 and 325. As shown, the processor core 310 is connected via a data path 330 to both register files 320 and 325. Also shown is an optional second data path 335 that couples optional second ports of the register files 320 and 325 to an external memory 390 through a bus interface unit 385 or to an internal memory 395 or to both via either a switch 350 and or a switch 355. A direct memory access/direct register access (DA/DRA) controller 340 is coupled to various control points in the architecture via lines 345 to control data flow between the register sets 320, 325, and memory 390, 395. The DMA/DRA controller 340 receives decoded instruction information from an instruction pipeline located within the processor core 310 over a bus activity line 370. Optionally, in a system with multiple instruction pipelines, the line 370 can provide cycle-by-cycle bus usage information from a resource manager that manages flow on the processor's internal data busses. The DMA/DRA controller 340 receives a priority indication signal from the processor core 310 over a priority line 375. In a preferred embodiment, the switch 350 connects the internal data path 330 to the bus interface unit (BIU) 385 which provides memory control signals to the external memory 390 and also provides a bi-directional data path thereto. In another preferred embodiment, the switch 350 also connects the alternate internal data path 335 to the bus interface unit 385 to allow for parallel transfers with other bus activity on internal bus 330. Data can transfer bidirectionally from the external memory 390 through the BIU 385, the switch 350, to either the register file 320 or the register file 325 via the path 330 or the alternate path 335. In some embodiments, the switch 350 may comprise a simple tristate bus interface. In other embodiments, the system may not use external memory at all, eliminating blocks 350, 385, and 390. In embodiments incorporating an optional internal memory 395, a switch 355 controls data flow between the register files 320, 325 and the internal memory 395 using either the path 330 or the path 335 or both paths. If internal memory 395 is used, the external memory 390 becomes optional.

The operation of the processor 300 in a typical processing environment is described below for a DSP programmed to provide echo cancellation on every fourth channel of a 24-channel T1 serial port. In this case, the DSP will cycle between tasks to provide echo cancellation to six telephone channels. Assume the processor is currently executing code to process channel 0 using the first register set 320. Since it is known the next interrupt will force the processor to process channel 4, the DMA/DRA controller 340 proceeds to store the current contents of the shadow register set 325 in either the internal memory 395 or the external memory 390. The DMA/DRA controller 340 monitors the internal CPU bus activity over the line 370 to determine when bandwidth is available between the register set and the memory. Then, by performing cycle-stealing using either the data path 330 or the alternate data path 335, the DMA/DRA controller 340 moves the current contents of the shadow register bank out to a first task control block data structure stored in the memory 390 or in the memory 395, and loads the shadow register set with a machine context for the next task to run from a second task control block structure also stored in the memory 390 or in the memory 395. The advantage is that the register loading and storing occurs in a cycle-steal mode using otherwise unused bandwidth between the shadow register file and either the internal memory 395 or the external memory 390. When the single-cycle task switch signal later occurs to switch to the next task (channel 4 task in this example), the processor 300 performs a single-cycle switch to activate the register set 325 and to shadow (deactivate) the register set 320. While processing the channel 4 task, the DMA/DRA controller 340 saves the contents of the shadow register set 320 to an appropriate task control block in the memory 390 or in the memory 395 and loads the saved register contents for the next task to run (channel 8 task). In this fashion, the processor 300 can cycle through the six channels over and over again without ever needing to spend CPU cycles on register set save and restore operations. All of the overhead occurs in the background in parallel with normal processing. The key is to perform the register set save and restore operations in advance of when they are needed using otherwise unused register-memory bandwidth.

An important aspect of this invention is that the DMA/DRA controller 340 is tightly coupled with the processor 300 in that it receives information from the decoded instruction stream and optionally from the bus interface unit 385 to let it know when the data paths to memory are free. Given the pipeline structure of high performance processor cores, the decoded information provided on the line 370 will be made available one cycle before the actual bus activity will occur. This allows the DMA/DRA controller 340 to intelligently schedule the register load/save operations, making use of otherwise unused bus bandwidth to perform the register to/from memory transfer operations. Hence in normal operation, once the register set is switched, the second register set is pushed into a memory stack area in the background without adding any cycles to the program execution.

Note the control lines 370, 375, and 380 in FIG. 3 between the DMA/DRA controller and the processor core. The line 370 moves information relating to pipelined instructions to the controller to let it know what type of bus activity will occur on the next cycle. This allows the DMA/DRA controller 340 to operate in an interlocked fashion with the processor so it can cycle steal without needing to arbitrate for the bus which would require additional overhead. The line 375 is the priority move command signal. The processor core 310 asserts the line 375 in response to a shadow register set switch command when the done signal on the line 380 is in a negated state. Upon assertion of the priority move command signal on the line 375, the DMA/DRA controller 340 takes full control of the bus and completes the remaining register save/load operation in burst mode.

In processors designed in accordance with the present invention, a single-cycle task switch command simply toggles between the active and inactive register sets. The shadow register set is, by definition, the inactive register set. The register set that is active is said to be in the active state and the register set that is inactive is said to be in the shadow state. When the single-cycle task switch command is issued, the active register set and the shadow register set switch roles. This mechanism allows nesting and stacking operations to proceed. The shadow register system appears as a two-register set circular buffer. This is needed to implement virtual shadow registers to allow the shadow register system to appear to have an arbitrary number of shadow register sets. Another construct used in the present invention is a shadow register empty flag which is automatically set when the shadow register contents have been stored and which is cleared upon a single-cycle task switch command. Conversely, some systems may use a shadow buffer full flag that is the Boolean inverse of the shadow register empty flag.

Figure 4:
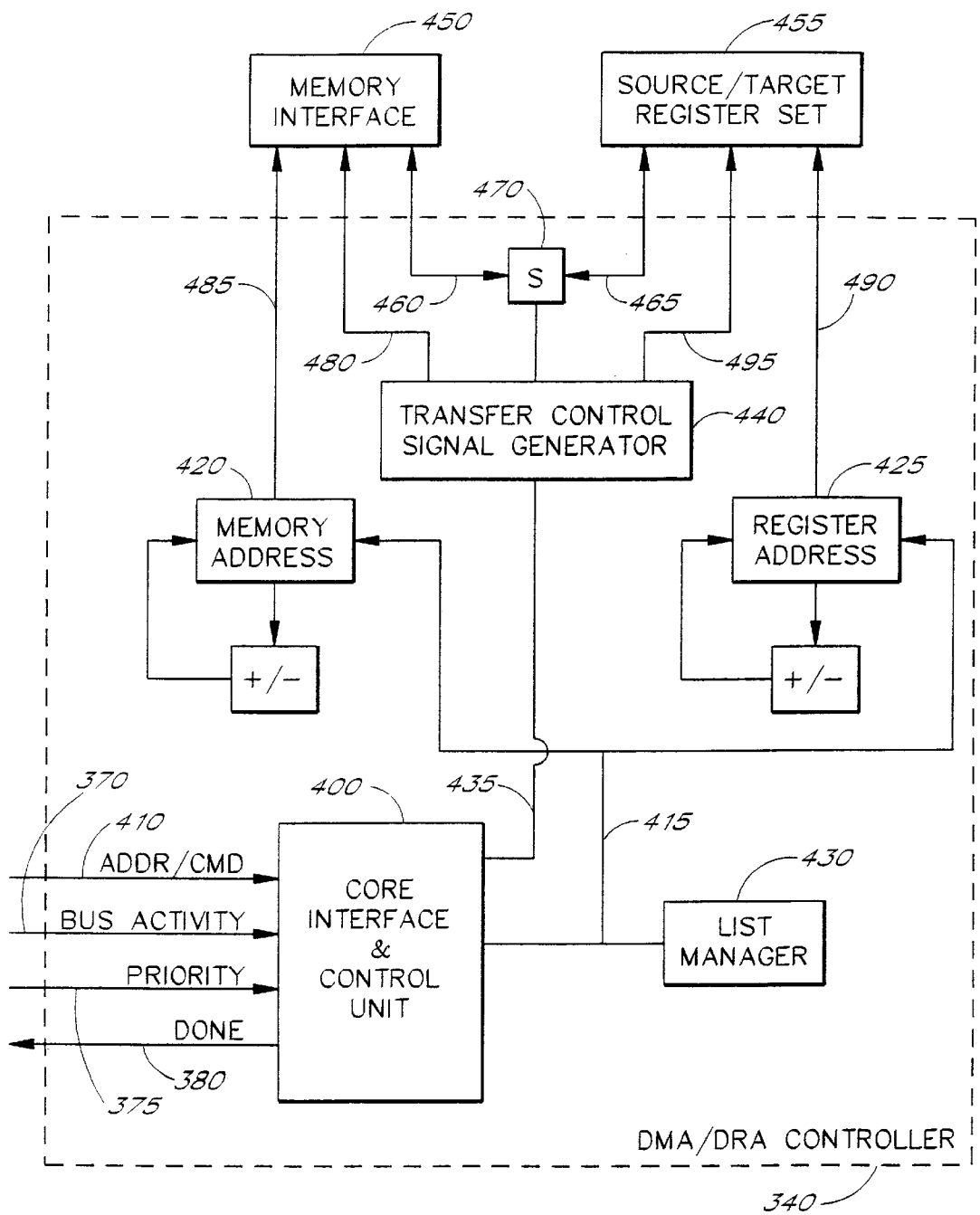
FIG. 4 is a block diagram that illustrates an embodiment of the DMA/DRA controller of the present invention.

FIG. 4 illustrates a preferred embodiment of the DMA/DRA controller 340 designed in accordance with the present invention. A core interface 400 receives the signals on the lines 370, 375, and 380 from the processor core 310 as discussed with respect to FIG. 3. The core interface 400 includes a control unit that is responsive to control signals asserted by the processor core 310 over the lines 370 and 375 and is also responsive to addresses and commands sent over a bus 410. The core interface 400 also sends back the done signal on the line 380 to indicate to the processor core 310 that one or more register set transfers are complete. Optionally, data and address information can come directly from memory or the active register set to the core interface 400. The core interface 400 is connected via a bus 415 to a memory address register 420 and to a register address register 425. As shown, the registers 420 and 425 can be implemented with auto-incrementing/decrementing hardware and can optionally have special addressing sequence generation hardware as is common, for example, in DSPs designed to execute FFTs. The bus 415 also connects the core interface 400 to a list manager 430. The core interface 400 also connects via a line 435 to a transfer control signal generator 440. In this diagram, any of the shown lines may include multiple parallel wires to carry multiple individual signals.

In operation, the DMA/DRA controller 340 acts as a tightly coupled functional unit, but does not require its own instruction stream. That is, the DMA/DRA controller 340 is tightly coupled to the processor's activity through the use of the input 370 from the processor core 310. The input 370 indicates to the DMA/DRA controller 340 information pertaining to the register accesses, internal data bussing, and memory accessing that will occur in the next cycle. This allows the DMA/DRA controller 340 to work in lock-step with the operation of the one or more processor pipelines and the bus interface unit 385. To perform a register save, the address of the top of the stack area in memory in which to save the register set is loaded into the memory address register 420. The address of either the primary or shadow register set is loaded into the register address register 425. This can be performed with a simple bit in an initialization command since the register set base addresses are known ahead of time. Once the addresses are loaded, the move can begin immediately, or the move can optionally be delayed or triggered by an input from the processor core 310. Once the transfer is initiated, the contents of the register set are moved to memory as controlled by the auto-incrementing/decrementing register and memory address pointers. This activity does not require constant interaction by the processor core 310. When the entire move is complete, the DMA/DRA controller 340 can signal completion to the processor by asserting the done signal on the line 380.

The present invention also provides for modes to allow the register set to be stored to memory and then loaded with a previously stored register set. This is called a store-and-load (S-A-L) operation. To implement this, for example, the processor core 310 writes a register set store address pointer followed by a register set load address pointer to the DMA/DRA controller 340. The processor core 310 also issues a single command telling the DMA/DRA controller 340 to both store the current contents of the shadow register set to the store address, and to load the shadow register set from the load address. Once the command is issued, the DMA/DRA controller 340 proceeds to first store the current register contents, and then load the registers from memory as specified. In some embodiments, additional information can be provided in the command to specify a partial register set store-and-load operation for cases when the only a portion of the register set needs to be stored or loaded or both.

An optional feature of the present invention is embodied in the list manager 430. The list manager 430 is used to maintain sequences of store-and-load addresses. For example, in a system that round-robins between a set of tasks, the list manager 430 will contain a linked list of descriptors, where each descriptor structure contains a store address pointer and a load address pointer as well as optional information such as priority level, information relating to partial register set oriented operations, and a link to the next descriptor. In the preferred embodiment, when the single-cycle task switch command is issued by the processor core 310 to toggle the active and shadow register sets, the list manager 430 automatically performs a store-and-load operation to ensure the shadow register set contains the appropriate data the next time a single-cycle task switch command is issued. In cases where the task will switch back and require the information already stored in the to the shadow register set, the descriptor will indicate this, for example, by placing null pointers in the store and load memory pointer locations. The list manager 430 may optionally contain a stack pointer that points to the top of an interrupt stack that is used to push and pop register sets in response to interrupts or commands from the processor core 310. Also, split store and load operations can be specified in the descriptors. In this case, the store operation will occur immediately, and the load operation will occur at a later time when the interrupting source is known. More details of this will be subsequently discussed with reference to FIG. 6 and FIG. 7.

Another aspect of the operation of the DMA/DRA controller 340 is the occasion when the DMA/DRA controller 340 begins a store-and-load operation and the next single-cycle task switch command is issued before the load-and-store operation has had time to complete. In this case, the processor core 310 signals to the DMA/DRA controller 340 via the line 375. In this instance, the DMA/DRA controller 340 takes priority on the bus so that the processor pipelines will stall in response to any bus conflicts that arise. In the case of burst transfers, a FIFO buffer or other means may be employed to quickly store the register contents on-chip to speed this event. For example, in some embodiments, the switch 470 may include an optional unidirectional FIFO buffer path to be used as a temporary store to save the current registers during burst transfers. In other embodiments, the switch 470 may include an optional bi-directional FIFO. In this case, many of the store and load operations can proceed in parallel to greatly increase the transfer rate during burst mode. Once the register set is loaded, the contents of the outbound FIFO can be stored to memory in a cycle-steal mode. Other techniques to achieve this same effect is to use high speed on-chip memory or cache as a temporary storage buffer during burst transfers.

Figure 5:
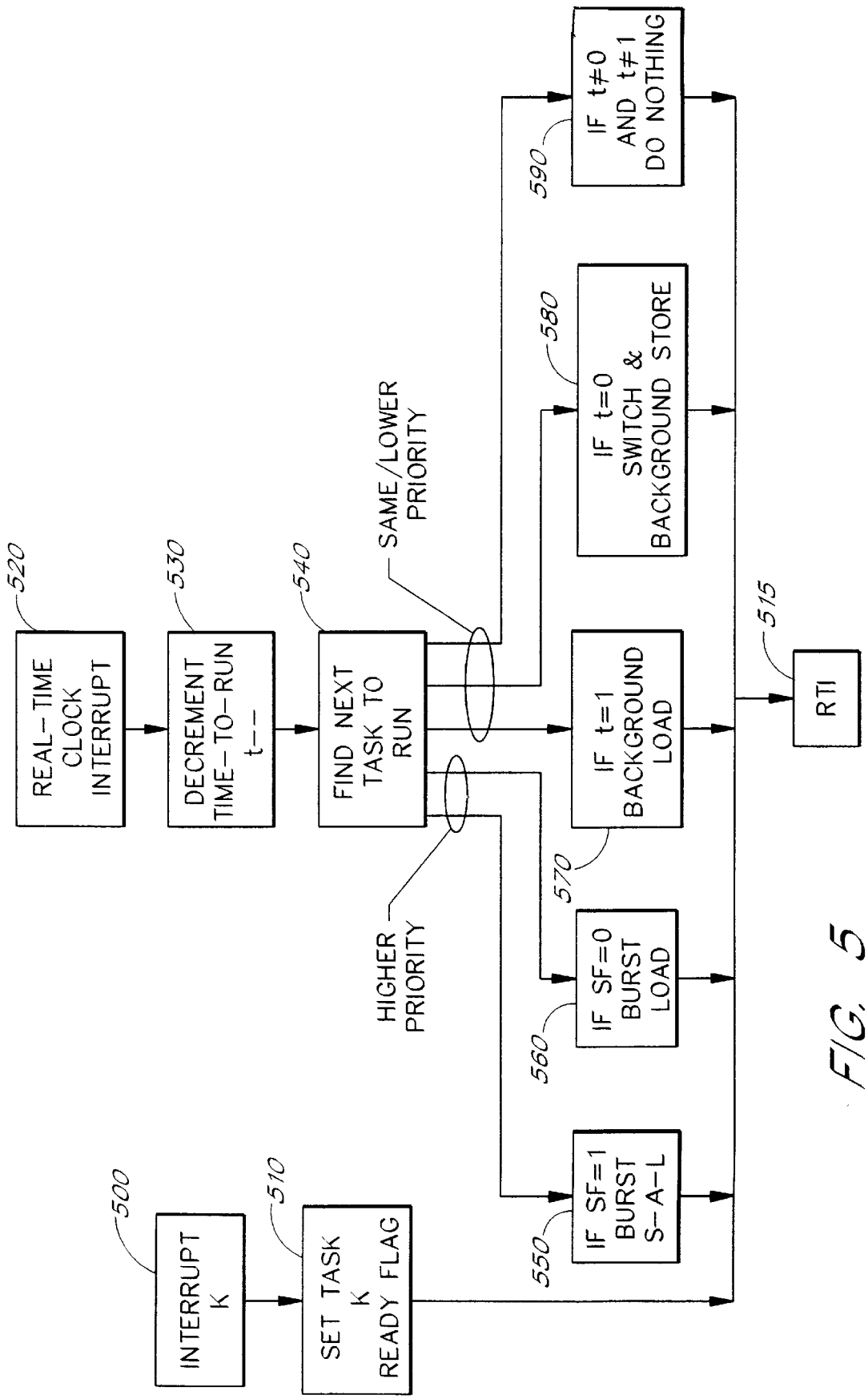
FIG. 5 is a block diagram that illustrates a method for accelerated task switching in a processor containing the shadow register system of the present invention.

FIG. 5 illustrates a method of accelerated task switching for use with a multitasking executive implemented in accordance with the present invention. It is to be understood that an actual multitasking kernel incorporating the present invention will often contain more blocks beyond those disclosed herein, but this minimal embodiment illustrates the concepts of the present invention. The executive is invoked by interrupts and schedules tasks for execution on a prioritized basis. Control is passed to the entry point of interrupt service routine (ISR) 500 when a system defined interrupt k is detected. Associated with interrupt k is a task k, and task k information is stored in a task k TCB. A TCB is a Task Control Block which is a data structure that stores task related information and machine context. In a block 510, the task k ISR sets the ready flag in the task k TCB and then issues a return from interrupt (RTI) in a block 515. When the real-time interrupt occurs, control is passed to the entry point of the scheduler ISR 520. At a block 530, a time-to-run variable, t, in the TCB of the currently running task, is decremented. At a block 540, the scheduler determines the next higher priority task that is ready to run. If the next highest priority task that is ready to run has a higher priority than the currently executing task, a task switch must be performed immediately. If a store flag (SF) is set, this indicates the shadow register set still needs to be stored. In this case, a burst store and load (S-A-L) command is issued, and the context switch is performed using the DMA/DRA controller 340 as described above. If the SF flag equal to zero, indicating that the shadow register contents have already been stored to memory, then a burst load is performed to move the high priority task's machine context into the shadow register set, a single-cycle task switch is performed, the return address is manipulated on the stack, a background store shadow register contents command is issued, and then the return from interrupt is issued to move control into the higher priority task. If the next task ready to run as evaluated in the block 540 has the same or lower priority than the currently running task, then control passes to either a block 570, a block 580, or a block 590, depending on the value of a time-to-run variable, t. If, for example, t has decremented to a value such that a task switch will occur on the next real time interrupt (t=1 in this example), a background register load command (BG-L) is issued to the DMA/DRA controller 340 to load the shadow register set with the machine context of the next task. If t has reached the time-out value (t=0 in this example) such that the task switch is to occur on this real-time clock tick, a single-cycle context switch command is issued along with a background-store (BG-S) command to store the context of the task that just finished into the appropriate TCB. If the time-to-run variable is not near time-out, control is passed to the block 590 which does nothing. After any of the blocks 570, 580 and 590, control is passed back to the appropriate task by the issuance of a return from interrupt instruction in the block 515.

The above multitasking executive will be implemented as a portion of the kernel of a real-time operating system. In many cases, especially in DSP applications, less general approaches may be desirable. The above example of the DSP providing six channels of echo cancellation processing on a 24-channel T1 line is an example where a less general approach may be desirable. In that example, it is known that the interrupts will occur in a predetermined order. When a real-time system is configured, it is known whether the interrupt needs to be serviced immediately, or if some delay is acceptable before servicing the interrupt. Hence, another aspect of the current invention is illustrated in FIG. 6.

Figure 6:
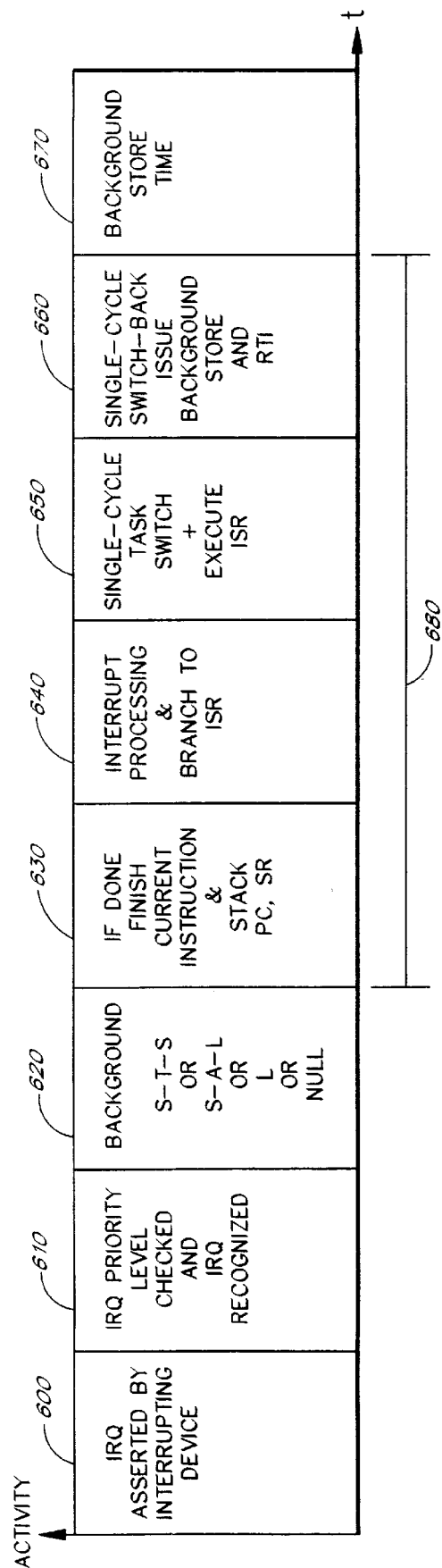
FIG. 6 is a time-line diagram that illustrates the actions taken by the processor in response to a delayed interrupt.

FIG. 6 illustrates the concept of a delayed interrupt. The delayed interrupt of the present invention allows specified interrupts to be marked as delayed interrupts that perform background shadow register set store operations. Referring to the time-line of FIG. 6, in a first phase 600, the interrupt request (IRQ) is issued by an interrupting device. In processors that use prioritized interrupt levels, in a block 610, the priority is checked against a set of interrupt mask bits usually stored in the status register of the processor 300. If the interrupt level exceeds the mask level, then the interrupt will be serviced; otherwise, other the interrupt level will not be serviced until the mask level is lowered. Once the interrupt is recognized, the DMA/DRA controller 340 is automatically loaded with a pointer that points to a register save area. This is often an interrupt stack pointer, a copy of which may be immediately accessible to the DMA/DRA controller 340 at all times in some implementations. Optionally, and depending on a flag bit in a descriptor shown in FIG. 7 discussed in greater detail below, the delayed interrupt may involve loading the shadow register with a saved set of register contents. In this case a load address pointer is also automatically made available to the DMA/DRA controller 340 when the interrupt is recognized.

In a block 620, either a background store-to-stack (S-T-S) operation or a background store-and-load (S-A-L) operation is performed to save the shadow register contents in the specified location and to optionally load the shadow register set with a machine context for the referenced ISR. The preferred mode of operation is to have the ISRs issue a background store prior to the return from interrupt command so that only a load (L) operation needs to be performed in a block 640. If the same interrupt happens to occur twice in a row, a status bit in the descriptor of FIG. 7 may indicate that no load is needed because the data is still fresh. In this case a null operation occurs and the done signal on the line 380 is issued immediately. The descriptor of FIG. 7 associated with an interrupt vector optionally indicates how many registers need to be stored based on how many registers the ISR will use. Once the S-T-S, S-A-L, L or null operation is finished in the background, the done flag on the line 380 is set by the DMA/DRA controller 340 and is recognized by the processor core 310. When the done flag is recognized in a block 630, the processor core 310 will allow its current instruction (or instructions) to finish, will stack the current machine status and return address, and then in the block 640 will vector off to the ISR. In a block 650, the ISR will then perform a single-cycle task switch and execute the ISR code. When the ISR is finished processing, it will perform a single-cycle task switch and return from the interrupt. Optionally, just after the second single-cycle task switch command and just before the return from interrupt (RTI) command, the ISR can issue background store command so that upon the next interrupt the store will not be needed. This is the preferred option where only a load or null operation will need to be is performed in the block 620 upon the next interrupt. If a second delayed interrupt occurs before the store is complete, the DMA/DRA controller 340 waits for the done signal before recognizing the next delayed interrupt. Note that nested interrupts are readily supported using the above approach with any of the discussed options. Also note that the effective amount of time required to service the interrupt is shown as a time segment 680. Time segments represented by the blocks 620 and 670 represent background cycle-stealing time that do not add overhead to the system.

Delayed interrupts serve as the basis for a method for accelerated task switching in a real-time multitasking executive. When an immediate interrupt is recognized, it is serviced immediately. If the done flag is already set, indicating the shadow registers are not in the middle of a load or store operation, then a single-cycle task switch can be issued along with a burst mode load operation to bring any needed information into the active register set. Right before the RTI, a background register-set store command can be issued. The scheduler operates on a delayed interrupt and follows the time line of FIG. 6. In this case, the real-time clock rate will preferably equal the task switch rate. The scheduler will manipulate the a descriptor in the list manager 430 to indicate the store information for the current task and the load information for the next task. In this manner, the overhead associated with context switching is largely eliminated by the real-time operating system.

Figure 7:
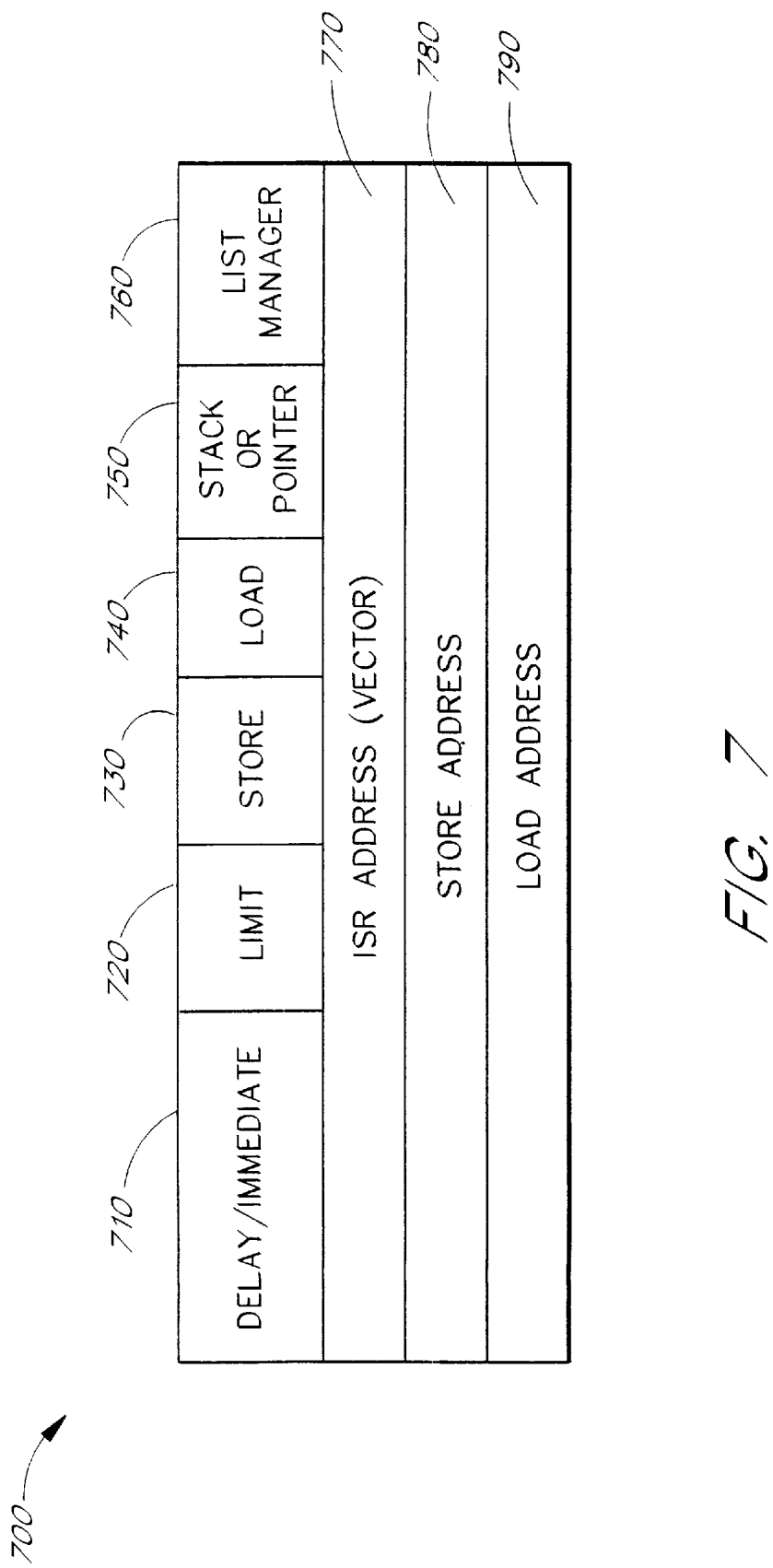
FIG. 7 is an interrupt descriptor which illustrates the contents of an embodiment of a interrupt descriptor of the present invention.

FIG. 7 illustrates one embodiment of the interrupt descriptor 700 which generalizes the concept of an interrupt vector. Conventional processors associate an interrupt vector with each interrupt, and, when the interrupt request is issued, after appropriate return address and status is stacked, the interrupt vector is loaded into the program counter so that the processor branches to the appropriate interrupt service routine. In some processors, the interrupt vectors are set to fixed locations and short code fragments are automatically executed in response to the interrupt. In these cases, a branch instruction can be placed at the associated target address to vector off to an ISR that does not fit in the small allotted area. These concepts need to be expanded for a system that supports delayed interrupts in accordance with the present invention.

The interrupt descriptor 700 of FIG. 7 has multiple fields that provide information about how the DMA/DRA controller 340 is to respond when the interrupt is recognized. Field 710 configures the interrupt to be a delayed interrupt or an immediate interrupt. If it is a delayed interrupt, the DMA/DRA controller 340 will initiate background store, load or store and load operations as specified by the descriptor. If the interrupt is an immediate interrupt, the DMA/DRA controller 340 will initiate burst mode store or load operations, also as specified by the descriptor and possibly the state of the done flag on the line 380. A field 720 configures a register set load/store limit indicator. In the preferred embodiment, the limit indicator is equal the number of registers that needs to be stored or loaded. Hence, if registers 1–8 need to be stored or loaded, then the limit value is set to eight. If zero registers need to be stored or loaded, the limit indicator is set to zero. Note this allows interrupts to generate the minimum required amount of DMA/DRA activity. A field 730 is an optional store field. This field indicates whether the shadow register contents need to be saved when the interrupt is recognized. The field 730 also can indicate if the shadow registers should be restored to their previous state from the store address upon return from interrupt. In most implementations, ISRs will issue a background store prior to exiting. In this case, a status bit is set to indicate the shadow register contents are already saved so that the store operation is not needed when the interrupt is recognized. The store address is specified by a field 790. A field 740 is the load field. The field 740 indicates if the shadow register set needs to be loaded with a saved register context, possibly after a shadow register store operation, when the interrupt is recognized. The load address is specified in a field 795. A field 750 indicates whether the interrupt stack pointer is to be used instead of the load address specified by the 790 for the store operation. A field 760 indicates whether the store or load addresses should be obtained from the linked list manager instead of from the fields 790 and 795. This mode is used, for example, when a plurality of tasks are controlled by a single interrupt such as a real-time clock or a T1 multichannel serial port. The conventional interrupt vector containing the address of the ISR is specified in a field 780. There are numerous modifications to how this the information contained in this descriptor could be distributed in the system. This descriptor is provided as an illustrative example of an aspect of the present invention. Different fields can be added, and the information in the shown fields can be mixed with additional information and stored in different parts of the system.

Figure 8:
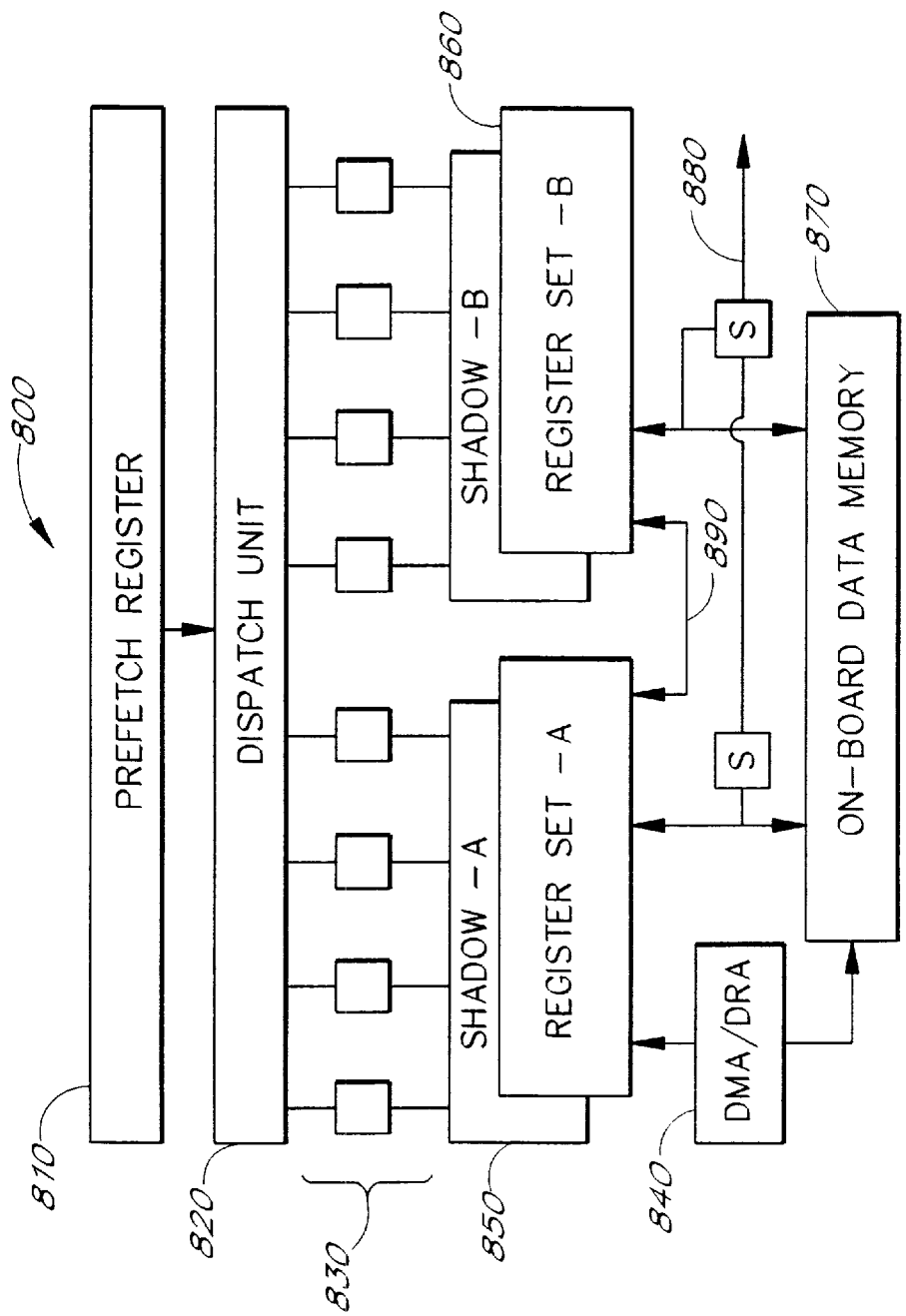
FIG. 8 is a block diagram that illustrates a VLIW DSP processor designed according to the present invention that incorporates a virtual register shadowing system.

Another aspect of the present invention is to provide a shadowing system for parallel register files as are found on multi-issue processors such as those with superscalar and very long instruction word (VLIW) oriented architectures. FIG. 8 is a block diagram illustrating a VLIW DSP 800 with a shadowing system implemented according to the present invention. This processor is an extension of the prior art TMS320C62xx processor as documented in Texas Instruments, Inc., document SPRU189B which is incorporated herein by reference. The VLIW processor 800 contains a prefetch register 810 that holds eight 32-bit instructions. A dispatch unit 820 receives the contents of the prefetch register 810, evaluates bits of the eight instructions contained therein, and determines to which of a plurality of functional units 830 to send each instruction. In some cases, only a subset of the eight instructions will be dispatched in a single cycle. The instructions are decoded and executed by the appropriate functional units in a multiply pipelined fashion. The functional units are connected either to a register set A 850 or to a register set B 860. In the current invention, the register sets 850, 860 contain shadow register sets connected similar to that shown in FIG. 3. The two shadow register sets are coupled to a DMA/DRA controller 840. The register set A 850 and the register set B 860 are also coupled to a bussing structure 880 that allows data to transfer in parallel between the register set A 850 and an on-board data memory 870 at the same time as data can transfer between the register set B 860 and the on-board data memory 870. The registers sets A 850 and B 860 and the on-board memory 870 are also coupled via the bussing structure 880 to an external memory interface unit (not shown).

The prior art VLIW processor is improved by adding an A-side shadow register set and a B-side shadow register set. The architecture is further improved by adding a dual-channel DMA/DRA controller 840. The DMA/DRA controller 840 can either consist of two separate DMA/DRA controllers such as the DMA/DRA controller 340, or it can consist of a dual-channel DMA/DRA controller. A dual-channel DMA/DRA controller differs from a single-channel DMA/DRA controller in that two shadow register set base addresses are provided and two memory store or load addresses are provided. In this way, the dual-channel DMA/DRA controller can store both the A-side register set and the B-side register set. In other embodiments, the A-side register set and the B-side register set can be stored and loaded as a single group by a single-channel DMA/DRA controller. If the limit field 720 of the descriptor 700 is set to a number smaller than the full register set size, the DMA/DRA controller 840 can skip over to the second register set early and only transfer a subset of the second register set. All of the previously described concepts can be applied to the VLIW processor by recognizing that the DMA/DRA transfers may be performed on one or more of the register sets. The register set transfers can be performed serially or in parallel depending on the implementation of the DMA/DRA controller. As in the previously described embodiments, the shadow register systems coupled with the DMA/DRA controller 840 can be used to provide accelerated task switching in a multitasking executive and can be used to provide delayed interrupt capabilities. The addition of the inventive shadow register system therefore increases the throughput and efficiency of the VLIW processor in interrupt driven environments. The shadow register system can also be used to accelerate algorithms by performing load/store operations on the shadow register set in the background while the VLIW processor manipulates data in the active register set.

Processors with virtual register window systems implemented according to the present invention will be now discussed. The virtual register window system of the present invention can implement deeper register window systems with less silicon area. This speeds up function calling operations without the cost normally associated with register window systems. Also, processors comprising a virtual register window systems of the present invention can perform context save and restore operations needed in task switching much faster than prior art processors incorporating register window systems with the equivalent depth.

Figure 9:
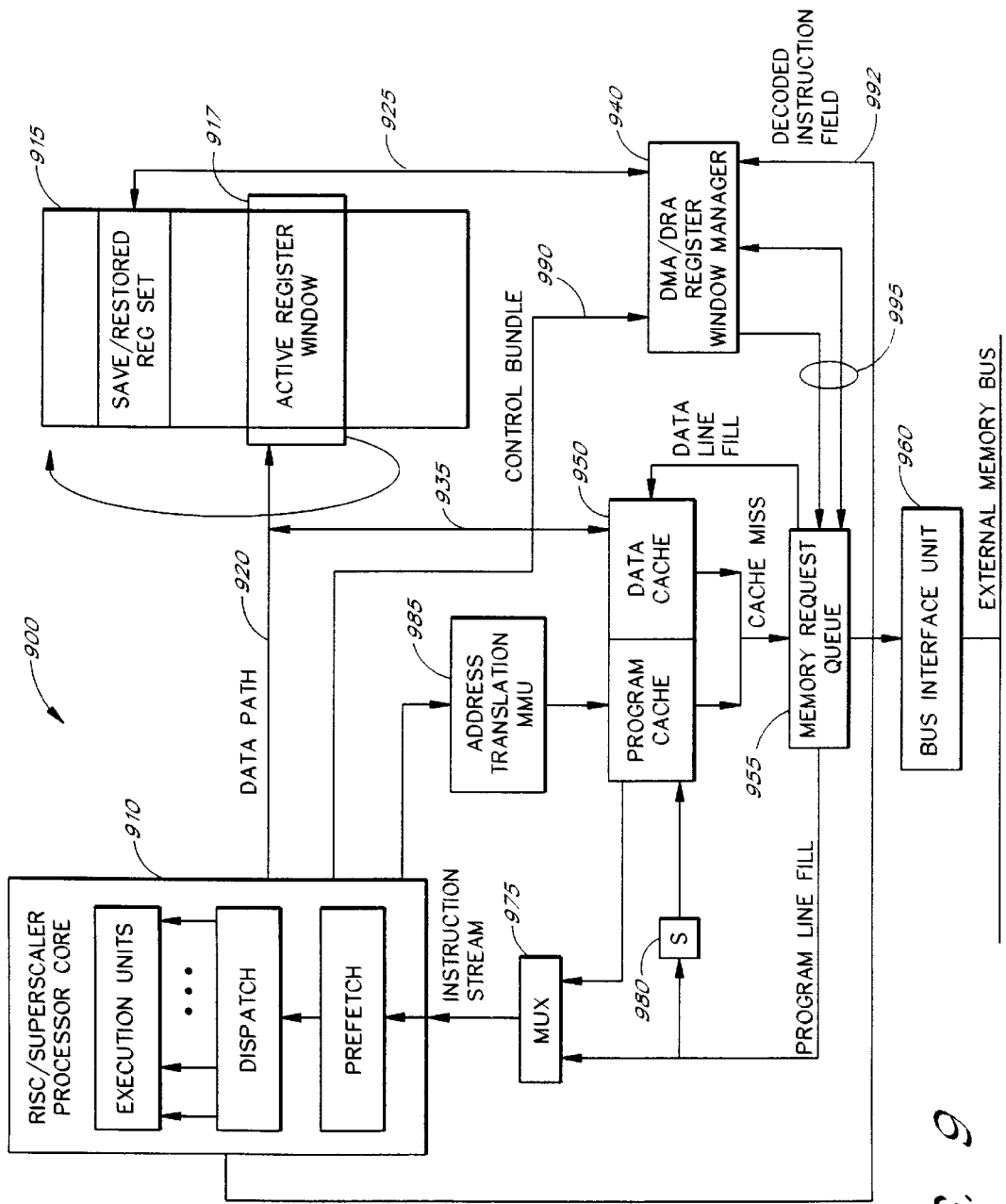
FIG. 9 is a block diagram that illustrates a RISC/Superscalar processor designed according to the present invention that incorporates a virtual register windowing system.

FIG. 9 illustrates an embodiment of a superscalar RISC processor 900 that provides a virtual register windowing system. The processor 900 includes a superscalar RISC core 910 incorporating a prefetch unit, a dispatch unit, and a plurality of instruction pipelines with associated functional units. A register window system configured in a circular buffer arrangement 915 is coupled to the processor core 910 via a data path 920. An active register window overlay 917 represents the portion of the register window buffer currently responsive to register operands in op-codes. The register window is defined by the register address decoding equations which take input for the register operands in the instruction op-codes and to the active register set field in a status register stored within the processor 900 (address decoder and status register not shown). The data path 920 may contain multiple parallel data paths so that multiple functional units in the processor core 910 can simultaneously fetch and store multiple register operands each cycle. An optional data path 925 provides a register load/store path through a DMA/DRA controller 940. In embodiments that include the optional data path 925, data paths 995 are provided to transfer register contents to and from an optional memory request queue 955. Optionally, the DMA/DRA controller 940 can control register/memory traffic over the data path 920, the data path 935 or both data paths 920, 935. The data path 935 couples the register traffic to an on-board cache memory 950, and the cache memory 950 in turn is coupled to the memory request queue 955 through a direct internal path. The memory request queue 955 is coupled to the bus interface unit 960. In some embodiments, the memory request queue 955 may be replaced by a straight through connection from the on-board cache memory 950 to the bus interface unit 960. The processor core 910 is responsive to an instruction stream that comes from an optional program portion of the cache 950 through an optional multiplexer 975. The other input to the multiplexer 975 is an instruction stream input that comes either from internal program memory (not shown) or from an external memory. A switch 980 couples the memory queue input to the program cache to service program cache misses. In an optional block 985, program and data addresses are translated from logical addresses used by the program into physical addresses used by the system in the conventional manner. A control path 990 carries control information between the processor core 910 and the DMA/DRA controller 940. A line 992 carries pipeline information to indicate when register bandwidth is available.

In operation, the processor core 910 executes a sequence of instructions specified by the instruction stream received from the multiplexer 975. When a call subroutine instruction is processed, the register window overlay 917 is moved in the conventional manner. It is known that the register windowing system can function with nearly no overflows if twelve to sixteen levels of registers are provided. However, using the concepts of the present invention, the register set 915 can be implemented, for example, as a circular buffer with only four levels. The additional eight to twelve levels can now be implemented as virtual registers stored in memory. In response to a subroutine call by the processor core 910 signaled over the lines 992 and 990, the DMA/DRA controller 940 may perform a background register store operation. The DMA/DRA controller 940 interacts with the memory queue device which may reorder memory access requests to perform the register set save operation in a cycle stealing mode. In actual programs, memory cycles are available because traffic is greatly reduced due to the on-board instruction and data caches 970. By making use of otherwise wasted bus cycles, the DMA/DRA controller 940 is able to extend the effective length of the fast switching register window system by pre-storing the oldest register set in the buffer to make room for the next function call.

The operation of the processor 900 in response to a subroutine return instruction will now be considered. The register window overlay 917 is moved in the opposite direction. In this case, the DMA/DRA controller 940 may load a previously saved register set into the back end of the circular buffer to fill the position just vacated by the subroutine return activation. When the subroutine return instruction is encountered, the processor core 910 will signal to the DMA/DRA controller 940 over the lines 990 and 992. The DMA/DRA controller 940 may respond by loading the appropriate register set from the memory stack. The transfer is carried out via the coupling to the memory request queue 955 and the bus interface unit 960.

Various options are available during processing. For example, if the buffer has not filled up yet, there is no reason to store and load register sets to/from memory. Also, if the compiler knows ahead of time that the code will not overflow the buffer, it may wish to insert inhibit codes into the instruction stream to inhibit store and load activity. Conversely, some implementations may only perform register store and or load operations under control of explicit register set store/load commands. Also, operands or limit control configuration words may be included to direct the DMA/DRA controller 940 to only save/load the registers actually used by a given subroutine. In cases when several function calls will be made immediately in a row so that the buffer will overflow, a priority burst signal over the control bundle of the lines 990 will signal the DMA/DRA controller 940 to perform a burst store-and-load operation. The reverse holds for situations where a string of successive function returns causes the buffer to underflow. In this case, the register window overlay 917 for the first level beyond the flushed register sets must be loaded in a burst mode. After this, the rest of the buffer may be loaded in the background mode unless another subroutine return occurs before the next register set is made available. In this manner, the register set will reload in the background mode unless a fast string of subroutine return commands is issued that creates an immediate need for a register set. In which case the rest of the needed register set will be loaded in the burst mode. Another optional parameter controls the distance in register sets between the active register set and the register set saved in the background. This parameter will normally be set to the length of the physical register window buffer, but could be shortened prior to task switching as will be described with respect to FIG. 10 below.

Figure 10:
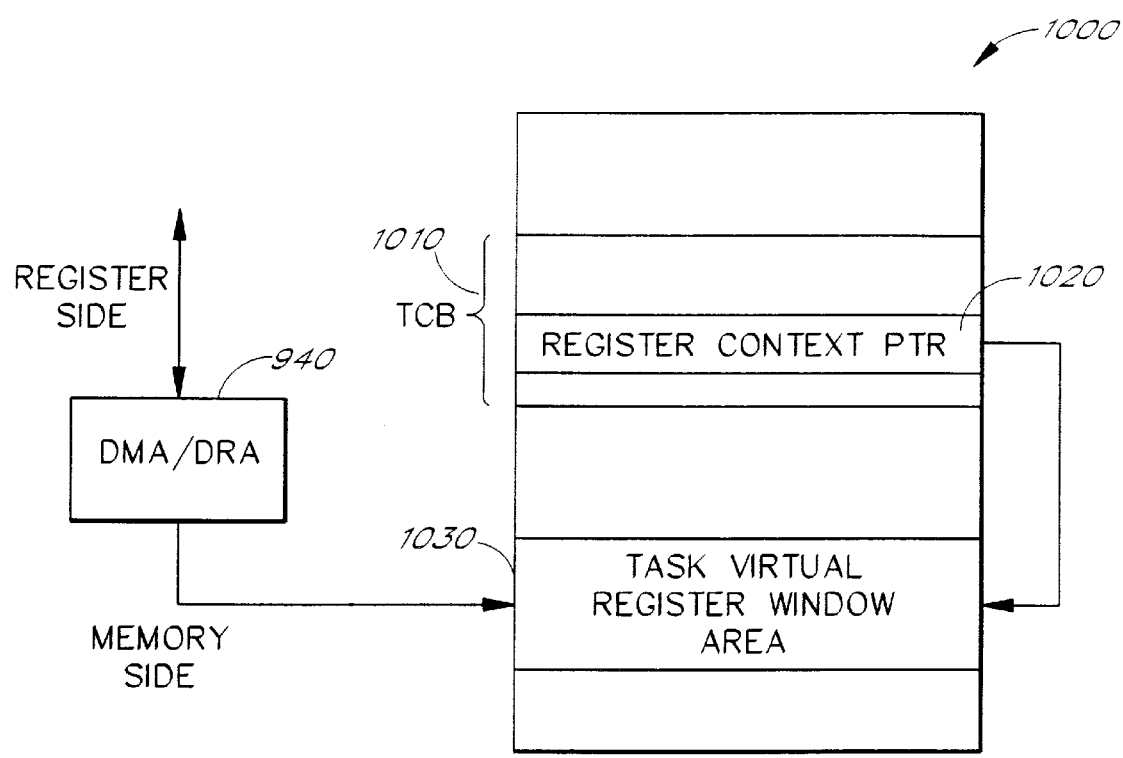
FIG. 10 is a block diagram that illustrates a method for reduced overhead task switching for processors incorporating register window structures.

FIG. 10 illustrates a method to accelerate task switching on processors with virtual register window systems. Shown in FIG. 10 is a DMA/DRA controller 940 as discussed with respect to FIG. 9. The DMA/DRA controller 940 is connected to an external memory 1000 via the memory request queue 955 and the bus interface unit 960, also as shown in FIG. 9. Stored in the memory 1000 is a set of task control blocks 1010 managed by the operating system. Each task control block stores a pointer 1020 to a context save area containing the task's entire active register window system 1030. In the present invention, the register window system is made to appear as a larger register window system by swapping virtual register sets between memory and the processors limited sized on-chip window buffer. If the current state of the machine includes a long set of registers, for example, twelve levels deep, then most of the register context is already saved in memory. In the method for accelerating task switching, the virtual circular buffer is linked directly into the task control block via pointer 1020 as shown. Thus, the portion of the register window system already resident in memory does not need to be saved.

Another aspect of the method for accelerated task switching is for the processor to manipulate the previously mentioned parameter in the DMA/DRA controller 940 that controls the distance in register sets between the active register set and the most recently stored register set. By setting the length to a small value such as one, a copy of all inactive register sets are maintained in memory at all times, if possible, using only background processing. In this mode, instead of only performing buffer save and restore operations at the roll-over point of the physical circular buffer, all inactive register sets are saved. The processor maintains the benefit of the full size of the physical buffer, but copies of the inactive register sets are maintained in memory whenever possible. Since only background cycle-stealing cycles are used, this comes at essentially no performance penalty. However, when the task switch occurs, all but the single active register set is already saved in the TCB, so that task switching only requires the single active register set to be saved, possibly using a FIFO or cache accelerated burst mode as discussed earlier. In practice, the mode of storing all inactive register sets to external memory is only invoked when the time-to-run indicator in the TCB has decremented to one as discussed with respect to the block 570 in FIG. 5. This is the indication that the next real-time clock pulse will cause the task to switch. Hence the present invention allows the processor to prepare for the task switch by maintaining a copy of all inactive register window sets in the same area used by the TCB to store machine context.

Other Embodiments

Although the present invention has been described with reference to a specific embodiment, other embodiments occur to those skilled in the art. For example, the DMA/DRA controller 340 could receive information over the line 370 indicating processor resource usage several cycles in advance instead of just one. Also, the information on the line 370 could indicate resource usage in the current cycle. Also, when the processor core 310 issues a single-cycle task switch command before the DMA/DRA controller 340 has time to complete the store-and-load operation, the DMA/DRA controller 340 could detect this condition and generate the priority move signal on the line 375 internally. Another modification is that the processor 300 could incorporate a second memory port to provide a separate store-and-load path that does not contend with the main memory path. Also, the delayed interrupt descriptors could be stored in external memory, internal processor memory, or within the DMA/DRA controller 340 itself without changing the scope of the invention. Also, some of the information contained in the descriptors could be made implicit. For example, certain options could be removed and then the default could be hardwired into the system. Some of the fields in the descriptors could change. For example, the limit field could specify both a start and an end register address for the move operations. Also, different types of interrupts, for example, at different priority levels, could have hard coded attributes contained in the interrupt descriptor of the present invention. In the VLIW processor of FIG. 8, more register sets than just two could be provided, in which case the DMA/DRA controller 840 would need to be able transfer some or all of the register sets. It is to be understood therefore, that the invention herein encompasses all such embodiments that do not depart from the spirit and scope of the invention as defined in the appended claims.

What is claimed is:

1. In an instruction set processor coupled to an internal or external memory, wherein said processor comprises one or more functional units and first and second register sets, said first register set operating in an active state responsive to processor instructions involving register operands, and said second register set operating in a shadow state not responsive to processor instructions involving register operands, said processor being adapted to switch said first register set to said shadow state and said second register set to said active state using at least one instruction, and a DMA/DRA controller capable of controlling sequences of data transfers between said first or second register set operating in said shadow state and memory, a method of register set storing and loading comprising:

configuring said DMA/DRA controller to transfer data between said register set operating in the shadow state and a buffer area in said memory; and transferring data, under the control of said DMA/DRA controller, between said register set operating in the shadow state and said memory buffer area.

2. The method of claim 1, whereby said act of configuring proceeds in parallel with a foreground processing task and uses information stored in one or more descriptors.

3. The method of claim 1, whereby said act of transferring comprises moving the register context of the register set operating in the shadow state into a memory storage area in order to save the context of a first task.

4. The method of claim 3, whereby said act of transferring further comprises moving into said register set operating in the shadow state a saved set of register values stored in memory and related to the context of a second task.

5. The method of claim 1, further comprising monitoring the bus activity in said processor to determine when unused memory bandwidth is available, with said act of transferring being performed at least during those cycles deemed to possess unused memory bandwidth.

6. The method of claim 5, whereby said act of transferring comprises moving the register context of the register set operating in the shadow state into a memory storage area in order to save the context of a first task.

7. The method of claim 6, whereby said act of transferring further comprises moving into said register set operating in the shadow state a saved set of register values stored in memory and related to the context of a second task.

8. The method of claim 5 further comprising responding to a priority move signal, such that when said priority move signal is asserted, said transferring will switch to a high priority burst mode, said burst mode using cycles as necessary to transfer data at a high data rate.

9. The method of claim 1, further comprising providing a first signal to a control unit associated with said instruction set processor when said transfer between said shadow register and said memory is complete.

10. The method of claim 9, further comprising:

issuing said at least one instruction to switch the active register set;

checking said first signal returned by the DMA/DRA controller; and
 (i) if said first signal is asserted, executing said active register set switch instruction; or
 (ii) if said first signal is not asserted:
  asserting a priority move signal; and
  executing said active register set switch instruction only after said first signal is recognized.

11. The method of claim 1, further comprising:

maintaining a set of tasks, each task having a corresponding task control block including priority and status information for said corresponding task, whereby a scheduler is activated in response to a real-time clock interrupt, said scheduler:

checking a ready flag in at least one of said task control blocks together with at least one priority indicator contained therein to determine the next task to run; and if a next task to run has a higher priority than the current task, said scheduler:

checking to see if a shadow register empty flag is set; and if said shadow register empty flag is set, said scheduler issuing a burst shadow register set load command to said DMA/DRA controller to fill said shadow register set with the context of the next task to run, and passing control to said next task to run; and if the shadow register empty flag is not set, said scheduler issuing a burst shadow register set store-and-load command to said DMA/DRA controller, and upon completion, passing control to said next task to run.

12. The method of claim 1, further comprising:

categorizing interrupt requests into at least two classes comprising a first class being a conventional interrupt, and a second class being a delayed interrupt;

when a received interrupt request is categorized as a delayed interrupt, issuing a shadow register set transfer instruction to said DMA/DRA controller to invoke said act of transferring; and when the DMA/DRA controller indicates said transfer is complete:
  finishing execution of the current instruction; and
  branching to the interrupt service routine associated with said received interrupt.

13. The method of claim 12, wherein said interrupt service routine issues a single-cycle active register set switch command to switch the register context from the active register set to the shadow register set.

14. The method of claim 12, wherein a single-cycle active register set switch command is issued to switch the active register context as a part of the interrupt processing sequence prior to activating the interrupt service routine.

15. The method of claim 12, wherein said shadow register set transfer instruction comprises a store-to-stack command.

16. The method of claim 12, wherein prior to issuing a return from interrupt command, said interrupt service routine issues a background save shadow register set command, the target address of said background save shadow register set command being specified by a specific pointer.

17. The method of claim 12, wherein the interrupt category and the DMA/DRA related information are contained at least in part within at least one interrupt descriptor, said at least one interrupt descriptor comprising at least one field useful in programming said DMA/DRA controller.

18. The method of claim 17, wherein said at least one interrupt descriptor further comprises an interrupt branch address.

19. The method of claim 17, wherein said at least one field comprises at least one of the following:

a limit field specifying at least a portion of the shadow register set requiring transfer;

a store field indicating that a store operation is required if a shadow register empty flag is not set;

a load field indicating whether said shadow register set needs to be loaded;

a stack field indicating whether act of transferring uses a stack pointer;

a list manager field indicating whether said interrupt is associated with a list manager that maintains a descriptor table;

a register set store address; and a register set load address.

* * * * *